United States Patent [19]

Deem et al.

[11] Patent Number: 4,465,286
[45] Date of Patent: Aug. 14, 1984

[54] SEAL FOR CLOSING A CAVITY

[75] Inventors: Brian C. Deem, Avon Lake; Ralph G. Eslinger, Elyria, both of Ohio

[73] Assignee: The Bendix Corporation, Southfield, Mich.

[21] Appl. No.: 468,092

[22] Filed: Feb. 22, 1983

[51] Int. Cl.³ .............................................. F16J 15/16
[52] U.S. Cl. ................................... 277/81 P; 277/153
[58] Field of Search .................. 277/81 P, 81 S, 82, 277/83, 153

[56] References Cited

U.S. PATENT DOCUMENTS

| 2,162,104 | 6/1939 | Mosher | 277/153 |
| 3,156,474 | 11/1964 | Nelson | 277/153 |
| 3,582,090 | 6/1971 | Lott | 277/81 P |
| 3,915,599 | 10/1975 | Kawamura | 277/81 P |

Primary Examiner—Robert I. Smith
Attorney, Agent, or Firm—Leo H. McCormick, Jr.; Ken C. Decker

[57] ABSTRACT

A seal assembly (54) for closing a cavity (55) between a rotor (24), a bearing retainer (38) and a crankshaft (80) to retain a fluid therein for lubricating bearings (48, 50, 90) associated with the crankshaft (80). Seal assembly (54) has a disc (72) with a first resilient member (56) that engages the rotor surface (44) and a second eccentrically positioned resilient member (62), that engages surface (65) on bearing retainer (38). Disc (72) which is attached to crankshaft (80) rotates with ring gear (36) around pinion (32) to maintain a sealed cavity (55) even though the first and second resilient members (56 and 62) rotate on their respectively sealing surfaces (44 and 65) with different revolutions per minute.

18 Claims, 5 Drawing Figures

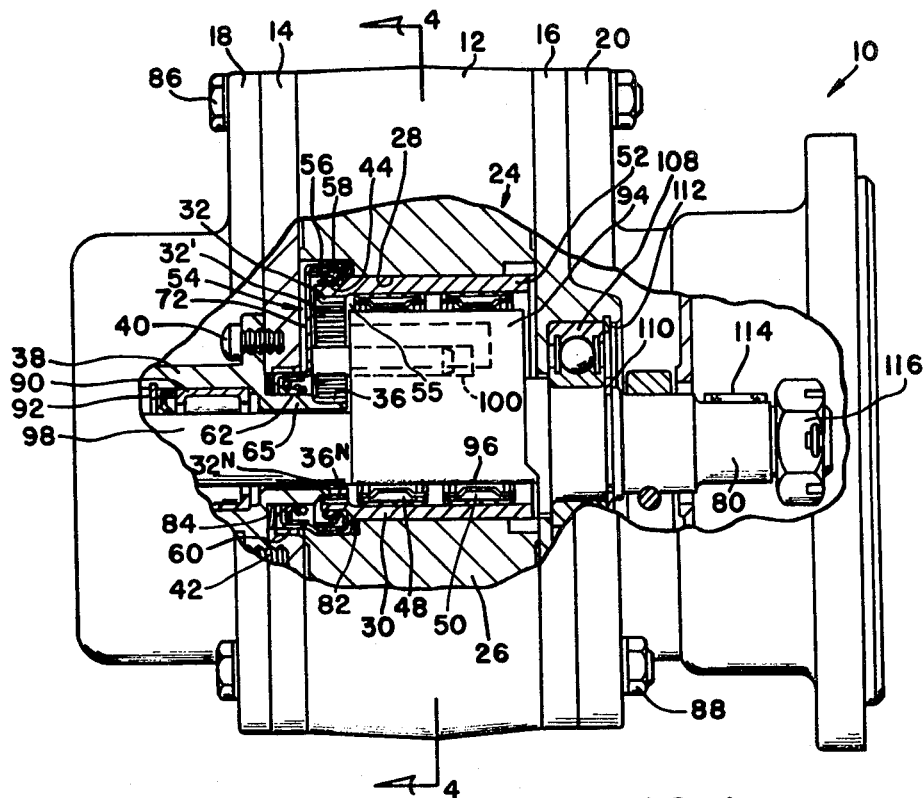
FIG. 1
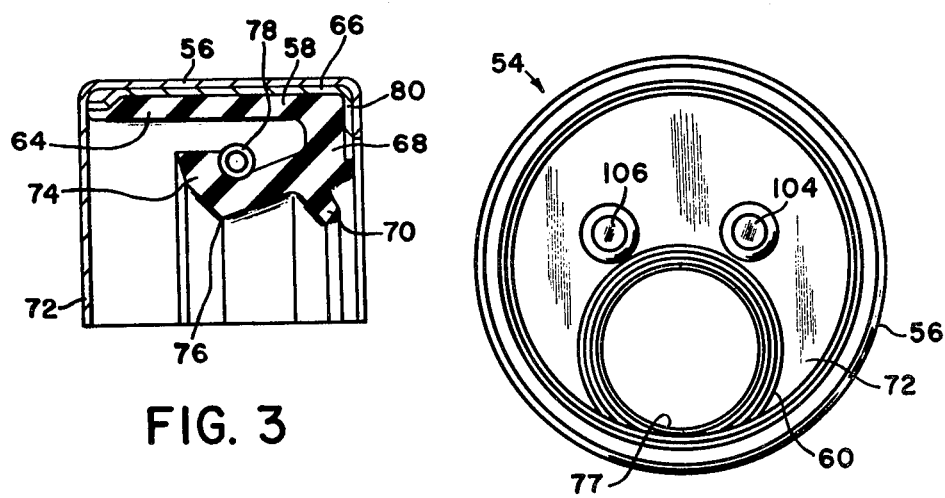
FIG. 3
FIG. 2

SEAL FOR CLOSING A CAVITY

This invention relates to a seal for closing a cavity between a rotor, a stationary end plate and a crankshaft of a compressor to retain lubricant in the cavity.

Rotary compressors such as disclosed in U.S. Pat. Nos. 3,165,259 Muller issued Jan. 12, 1965; 3,415,444 Trenzel et al issued Dec. 10, 1968; and 4,058,321 Gavrun et al issued Nov. 15, 1977 disclose various prior art seal structure for retaining a lubricant in an operational cavity between a crankshaft and rotor member. In such compressors, the bearings for the crankshaft are sealed by a lip-ring type seal and a thrust type face seal used to seal the rotor and retain a lubricant in the crankcase cavity. Because of the rotational speed and oscilatory motion which are experienced by the crankshaft and rotor, after a period of use one or both of such seals often fail.

Since the crankshaft rotation is normally at a higher revolution per minute than the rotor, the bearing seals most often fail first; however, the thrust type seals can twist and produce non-uniform contact which can produce a resulting leak after a period of use.

When such failure occurs, the lubricant either flows into the compression chamber or is communicated into the surrounding environment.

SUMMARY OF THE INVENTION

In the present invention a seal closes the cavity between a rotor, a stationary end member and a crankshaft to retain a lubricant therein. The seal has a first flange that retains a first resilient member that engages a first surface on the stationary pinion gear and a second flange that retains a second resilient member that engages a second surface on a ring gear on the rotor. The rotor responds to an input from the crankshaft to move within a chamber and expell fluid therefrom. While the seal is fixed to the crankshaft, the resilient members rotate independently of each other as a function of the rotational speed of the rotor during operation of the pump.

In another embodiment, one seal is attached to the rotor and another seal is attached to the housing. A disc shaped can attached to the rotor has a first flange that engages the first seal and a second flange that engages the second seal. The rotational frequency of the rotor is less than the crankshaft. In this instance the rotor seal rotates at a fractional ratio of the crankshaft rotation i.e., 1:2; 2:3; 3:4; etc. and the housing seal remains stationary. Since the centrifugal forces acting on the rotor seal is directly proportional to the rotational frequency squared, it is evident that centrifugal loading of the rotor seal is reduced resulting in more effective sealing.

An advantageous effect of this invention is achieved since both the crankshaft and rotor bearing are connected to the sealed cavity through a single sealing arrangement.

A further advantage of this invention occurs through the use of a seal having a substantially disc shaped housing wherein a first resilient member is retained on its periphery that engages a surface on a rotor member and a second resilient member eccentric to the housing that engages a surface on a fixed pinion member to retain libricant in the cavity. The eccentric throw is identical to the throw of a crankshaft that drives the rotor member in the pump to move fluid. While the seal turns with the rotor, it is only responsive to the gear relation and the eccentric of the gear drive.

It is an object of this invention to provide a rotor pump or compressor with seal member that engages both the rotor and crankshaft to close and retain a lubricant in a cavity and prolong the operational life of bearings that position the rotor in the cavity.

These advantages and objects should be apparent from reading this specification while viewing the drawings.

BRIEF DESCRIPTION OF THE DRAWINGS

FIG. 1 is a side view of a compressor with a sectional view of a seal made according to the principles of this invention.

FIG. 2 is an end view of the seal of FIG. 1;

FIG. 3 is a sectional view taken along line 3—3 of FIG. 2; and

DETAILED DESCRIPTION OF THE INVENTION

Figure 4:
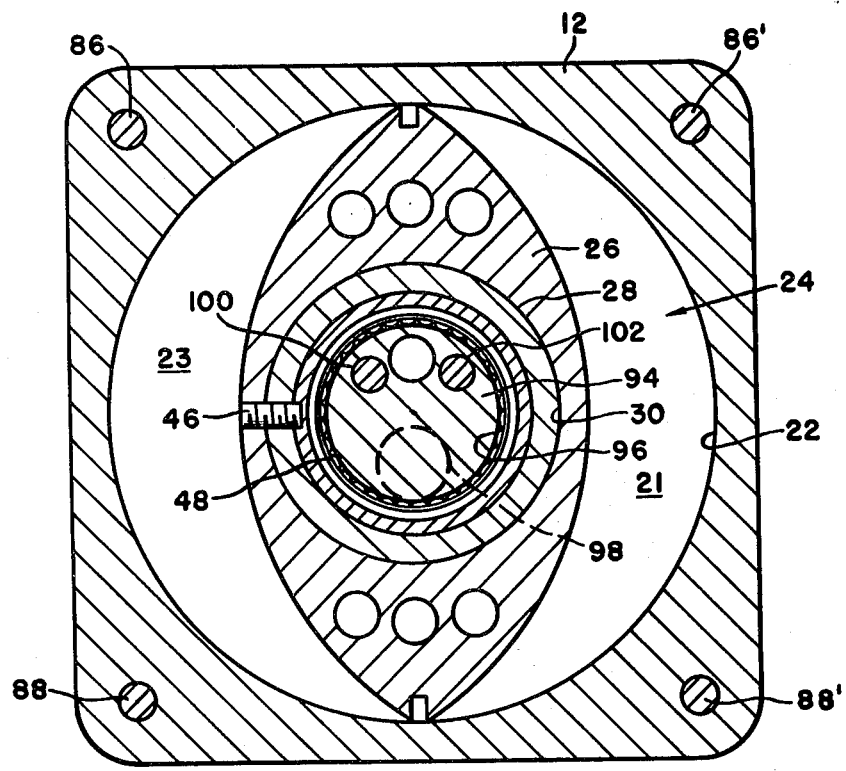
FIG. 4 is a sectional view taken along line 4—4 of FIG. 1.

The pump or compressor 10 shown in FIG. 1 has a central housing 12 which is attached to bearing plates 14 and 16 and end caps 18 and 20. As best shown in FIG. 4, the center housing 12 has an axial bore 22 located therein for receiving a rotor assembly 24. The rotor assembly 24 has an elliptical body 26 with a cylindrical axial opening 28. A sleeve 30 having a series of teeth $32, 32' \ldots 32^N$ on one end 34 thereof is inserted into the axial opening 28. The teeth $32, 32' \ldots 32^N$ form a ring gear which engage corresponding teeth $36, 36' \ldots 36^N$ on a pinion formed on a bearing retainer 38 which is fixed to end plate 14 by fasteners 40 and 42. Sleeve 30 which has an annular surface 44 located adjacent end 34, is fixed in the axial opening by set screw 46 that extends through the elliptical body 26. Needle bearing 48 is press fit in sleeve 30 adjacent end 34 while needle bearing 50 is press fit in sleeve 30 adjacent end 52.

A seal assembly 54 attached to crankshaft 80 has a disc 72 with a first flange 56 that retains a first resilient member 58 and a second flange 60 that retains a second resilient member 62. The first resilient member 58 engages surface 44 on sleeve 30 while the second resilient member 62 engages surface 65 on bearing retainer 38.

With the exception in size, both the first and second resilient members 58 and 62 of the seal assembly 52 are identical, therefore, only resilient member 58 shown in FIG. 3 will be described in detail.

Resilient member 58 has a cylindrical body 64 that is molded onto ring 66. A rib 68 that extends from the cylindrical body 64 has an annular seat 70 that engages surface 44 to effect a seal between the sleeve 30 and disc shape body 72. An annular flap 74 which extends from rib 68 has an annular projection 76 that engages surface 44 to establish an additional seal with surface 44. A coil spring 78 located in groove 80 acts on the annular flap 74 to provide a continual force that urges projection 76 into engagement with surface 44. A first thrust ring 82 is located on surface 44 and a second thrust ring 84 is located on surface 65 engage seal 54. When bearing retainer 38 is fixed to end plate 14 and housing bolts 86 and 88 tightened to join end caps 18 and 20, plates 14 and 16 and housing 12 together, thrust rings 82 and 84 act on seal 54 to assure that surfaces 70 and 76 on resilient members 58 and 62 are held in a position whereby a seal occurs.

As best shown in FIG. 2, opening 77 in disc 72 associated with the second resilient member 62 is offset or eccentric to the center of disc 72. The offset or throw is equal to the throw of the crankshaft 80.

Crankshaft 80 has a first section 98 that is retained in a bearing 90 located in retainer 38. A seal and snap ring 92 engage retainer 38 to hold the bearing 90 in the retainer 38. The throw section 94 of the crankshaft has a periphery surface 96 that engages bearings 48 and 50 and openings 100 and 102 for receiving drive keys 104 and 106 which extend from disc 72 of seal assembly 54.

A bearing 108 is attached to a third section of the crankshaft 80 by a snap ring 110 and is attached to end plate 16 by a snap ring 112. The crankshaft 80 has a key way (not shown) into which a key 114 is inserted for fixing a sheave (not shown) to the crankshaft 80. A nut 116 holds the sheave in place in order that an input can be provided to rotate the crankshaft 80.

MODE OF OPERATION OF THE INVENTION

When an input is supplied to the crankshaft 80 of pump or compressor 10, the crankshaft is rotated about its axis on bearings 90 and 108. Rotation of crankshaft 80 causes throw section 94 to supply a corresponding rotary input to the elliptical body 26. The elliptical body rotates in bore 22 to move fluid through the chambers 21 and 23 formed therein.

Seal assembly 54 is floating and independent of the elliptical rotor 26 and crankshaft 80. While seal assembly 54 turns with crankshaft 80 through the engagement of pins 104 and 106, it is only responsive to the relationship of teeth on ring gear 32 and pinion 36 and the eccentric of the crankshaft 80. The contact of the teeth on ring gear 32 and pinion 36 remains at a fixed dimension since the seal 54 has the same dimensional eccentricity as crankshaft 80. Thus, resilient member 58 turns on surface 44 of sleeve 30 at a first revolution per minute and on surface 65 on bearing retainer 38 at a second revolution per minute as disc 72 follows the pinion 36 around the ring gear 32 to maintain a sealed cavity even with different revolutions occuring on the first and second resilient surfaces 56 and 62.

While thrust rings 82 and 84 do engage the flanges 56 and 60, they are selected so as to exert a minimum of frictional resistance to the movement of seal assembly 54.

Since seal assembly 54 closes the cavity 55 defined by seal 54 and throw 94 on crankshaft 80, lubricant contained in cavity 55 is transferred between bearings 48 and 50 and end bearing 90 as ring gear 32 moves around pinion 36. Thus, the floating seal assembly 54 compensates for the oscillating motion and speed differentials of the crankshaft and rotor to assure long life for the compressor 10 without a bearing failure.

Figure 5:
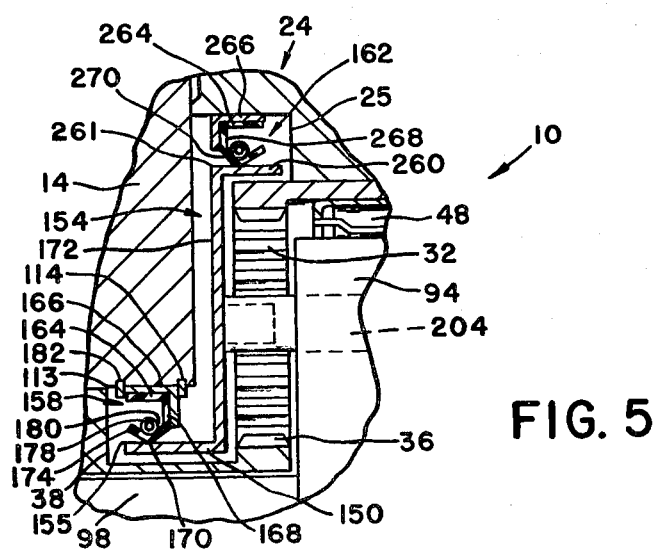
FIG. 5 is a sectional view of another embodiment of a sealing structure made according to this invention.

In the sectional view of pump or compressor 10 the embodiment shown in FIG. 5 where the parts are identical with the parts in FIG. 1, the same reference numeral is used.

The seal assembly 154 includes a first resilient member 158, a disc 172, and a second resilient member 162.

The first resilient member 158 has a cylindrical body 164 that is molded onto ring 166. A rib 168 extends from cylindrical body 164 has an annular seat 170 that engages surface 155 on flange 156 of disc 172 to effect a first seal between housing 14 and disc 172. In addition, an annular flap 174 which extends from rib 168 has an annular projection 176 that engages surface 155 to provide an additional sealing surface on said flange 156. A coil spring 178 located in groove 180 acts on the annular flap 174 to provide a constant force that urges projection 176 into engagement with surface 155. The first resilient member 158 is press fit in opening 113 in end plate 14 until ring 166 engages shoulder 114. A snap ring 182 acts on ring 166 to assure that the first resilient member 158 is retained in a substantially fixed position in opening 113.

The second resilient member 162 which press fits into annular groove 25 on rotor 24 which is substantially identical with the first resilient member 158, has a cylindrical body 264 that is molded onto a ring 266. A rib 268 extends from cylindrical body 264 has an annular seat 270 that engages surface 261 on flange 260 of disc 172 to effect a second seal between rotor 24 and disc 172. The second resilient member 162 has an annular flap 274 which extends from rib 268. An annular projection 276 on flap 274 engages surface 261 to provide an additional sealing surface on flange 260. A coil spring 278 located in groove 280 acts on the annular flap 274 to provide a constant force that urges projection 276 into engagement with surface 261.

The disc 172 is connected to rotor 94 by drive pins 204, only one of which is shown. The drive pins 204 are designed such that some clearance is assured between disc 172 and housing 14, rotor 24 and ring 166 to avoid frictional engagement that could cause deterioration.

During the operation of a pump or compressor 10 equipped with the seal assembly 154 shown in FIG. 5, the first resilient member 158 remains stationary while the second resilient member 262 rotates with the rotor 24 which is one-half the rotational speed of the crankshaft 80. Centrifugal forces acting on the first and second resilient members 158 and 262 are directly proportional to the rotational frequency squared. Since the first resilient member 158 remains stationary, centrifugal loading is substantially eliminated and thus a potential leak path for lubricant is greatly reduced.

I claim:

1. A seal assembly for closing a cavity located between a rotor, a stationary end member, and a crankshaft to retain a lubricant therein, said seal assembly being characterized by a disc having an eccentric opening therein, a first flange surrounding said opening and a second flange surrounding the peripheral surface of the disc, a first resilient member retained by said first flange, and a second resilient member retained by said second flange, said first resilient member engaging said stationary end member and said second resilient member engaging said rotor to allow said disc to rotate with said rotor in response to an input from said crankshaft, said first and second resilient members rotating at a fractional ratio of the rotation of said crankshaft to reduce centrifugal loading and thereby effectively seal said cavity.

2. The seal assembly as recited in claim 1 wherein an end of said crankshaft extends through an opening in said stationary end member, said stationary end member having a first annular surface concentric to said opening therein, said first resilient member engaging said first annular surface, said first resilient member rotating on said annular surface as a function of the rotation of said rotor.

3. The seal assembly as recited in claim 2 wherein said rotor has a second annular surface, said second resilient member engaging said second annular surface, said second annular surface rotating with respect to said second resilient member.

4. The seal assembly as recited in claim 3 wherein said first flange includes a first inwardly projecting lip, said first lip and flange forming a first groove to substantially fix the position of said first resilient member with respect to said disc.

5. The seal assembly as recited in claim 4 wherein said second flange includes a second inwardly projecting lip, said second lip and flange forming a second groove to substantially fix the position of said second resilient member with respect to said disc.

6. The seal assembly as recited in claim 5 further including a first thrust ring located between said stationary end member and said first lip to establish the position of said first resilient member with respect to said first annular surface.

7. The seal assembly as recited in claim 6 further including a second thrust ring located between said rotor and said second lip to establish the position of said second resilient member with respect to said second annular surface.

8. The seal assembly as recited in claim 6 wherein said first resilient member includes a first cylindrical member with a first base and a first rib extending from said base, said first rib having a first annular flap that engages said first annular surface on said stationary end member, said first annular flap permitting limited eccentricity between the first annular surface and said first resilient member without eliminating contact therebetween on rotation of said disc.

9. The seal assembly as recited in claim 8 wherein said first cylindrical member further includes a second flap extending from said first rib and a first biasing spring retained by said second flap for urging said second flap toward said first annular surface to aid in establishing backup contact with said first annular surface on rotation of said disc.

10. The seal assembly as recited in claim 9 wherein said second resilient member includes a second cylindrical member with a second base and a rib extending from said second base, said second rib having a third annular flap that engages said second annular surface, said third annular flap permitting limited eccentricity between said rotor and said second resilient member without eliminating contact therebetween on rotation of said disc.

11. The seal assembly as recited in claim 10 wherein said second cylindrical member further includes a fourth flap extending from said second rib and a second biasing spring retained by said fourth flap for urging said fourth flap toward said second annular surface to aid in establishing backup contact with said second annular surface on rotation of said disc.

12. The seal assembly as recited in claim 11 wherein said rotation of said disc is controlled by the relationship of a pinion gear formed on said stationary end member adjacent said first annular surface and a ring gear formed on said rotor.

13. A seal assembly for closing a cavity located between a rotor, a stationary end member, and a crankshaft to retain a lubricant therein, said seal assembly being characterized by a disc having an eccentric opening therein and connected to said crankshaft, said disc having a first flange surrounding said eccentric opening and a second flange surrounding the peripheral surface of said disc, said first flange engaging a first resilient member secured to said end member, said second flange engaging a second resilient member secured to said rotor, said disc rotating at the same revolutions per minute as said crankshaft while said first resilient member remains substantially stationary and said second resilient member rotates at a fractional ratio of the rotation of said crankshaft to reduce centrifugal loading and thereby effectively seal said cavity.

14. The seal assembly as recited in claim 13 wherein said first resilient member includes a first cylindrical member with a first base and a first rib extending from said base, said first rib having a first annular flap that engages said first flange on said disc, said first annular flap permitting limited eccentricity between the first flange and said first resilient member without eliminating contact therebetween on rotation of said disc.

15. The seal assembly as recited in claim 14 wherein said first cylindrical member further includes a second flap extending from said first rib and a first biasing spring retained by said second flap for urging said second flap toward said first flange to aid in establishing backup contact with said first flange on rotation of said disc.

16. The seal assembly, as recited in claim 15 wherein said second resilient member includes a second cylindrical member with a second base and a rib extending from said second base, said second rib having a third annular flap that engages said second flange on said disc, said third annular flap permitting limited eccentricity between said rotor and said second flange without eliminating contact therebetween on rotation of said disc.

17. The seal assembly, as recited in claim 16 wherein said second cylindrical member further includes a fourth flap extending from said second rib and a second biasing spring retained by said fourth flap for urging said fourth flap toward said second flange to aid in establishing backup contact with said second flange on rotation of said disc.

18. The seal assembly, as recited in claim 17 wherein said rotation of said disc is controlled by the relationship of a pinion gear formed on said stationary end member and a ring gear formed on said rotor.

* * * * *